UNITED STATES PATENT OFFICE.

MAX DOHRN, OF BERLIN, GERMANY, ASSIGNOR TO CHEMISCHE FABRIK AUF ACTIEN (VORM. E. SCHERING), OF BERLIN, GERMANY.

BROMISOVALERIC ESTER OF THE BORNEOLS.

No. 930,054.  Specification of Letters Patent.  Patented Aug. 3, 1909.

Application filed February 19, 1908. Serial No. 416,686. (Specimens.)

*To all whom it may concern:*

Be it known that I, MAX DOHRN, doctor of philosophy, chemist, citizen of the German Empire, residing at Berlin, Germany, have invented a new and useful Improvement in Bromisovaleric Acid Esters of the Borneols, of which the following is a specification.

My invention relates to the manufacture of the hitherto unknown bromisovaleric acid esters of the borneols—borneol and isoborneol—having the formula

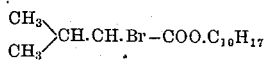

in which $C_{10}H_{17}$ signifies the bornyl or isobornyl radical. They are colorless oily fluids, insoluble in water, soluble in organic solvents, for instance, alcohol, ether, benzol, chloroform and acetone, and possess medicinally sedative properties. These esters may be prepared by allowing bromisovaleric acid halogenid or anhydrid to react upon the borneols, or by treating bromisovaleric acid with the borneols in the presence of a suitable condensing agent, or by brominating the borneol esters of isovaleric acid. The bromisovaleric acid isoborneol ester may also be obtained by allowing bromisovaleric acid to react upon camphene in the presence of a suitable condensing agent, such as zinc chlorid, sulfuric acid, hydrochloric acid, and the like.

Examples.

1. 900 grams of bromisovaleric acid bromid or the equivalent quantity of the chlorid are heated on a water bath with 560 grams of borneol dissolved in about 1,800 grams of chloroform, until hydrobromic or hydrochloric acid is no longer evolved. The product of the reaction is washed with neutral dilute soda solution, separated from the water and dried by means of sodium sulfate. After distillation of the chloroform the bromisovaleric acid borneol ester is distilled *in vacuo.* It boils at 163° centigrade under a pressure of 10 millimeters and is a colorless thick oily fluid. This reaction is illustrated by the following equation:

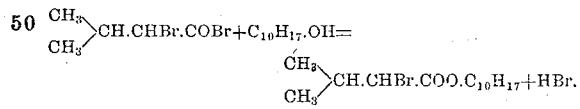

2. 500 grams of bromisovaleric acid anhydrid are heated for a long time on a water bath with 450 grams of borneol and then treated with water and soda. The oil produced is absorbed with ether and dried by means of sodium sulfate; the ether is then distilled off and the residue fractionated in a vacuum. This reaction is illustrated by the following equation:

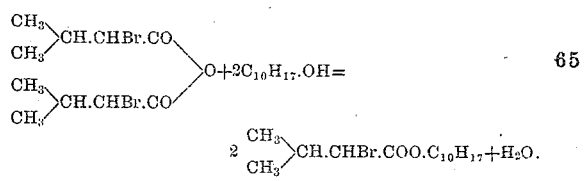

3. 250 grams bromisovaleric acid are heated to about 70° to 80° centigrade with 200 grams of borneol with the addition of 20 grams of concentrated sulfuric acid. After about 20 hours water is added to the product of the reaction which is then further treated as in the foregoing examples. This reaction is illustrated by the following equation:

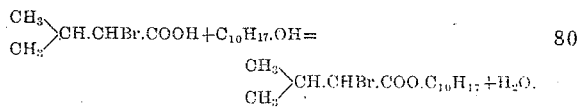

4. 250 grams of bromin are added in drops to 500 grams of isovaleric acid borneol ester while heated on the water bath until the solution is colorless. In order to retain the hydrobromic acid, sodium carbonate may be added. The solution is afterward distilled *in vacuo.* This reaction is illustrated by the following equation:

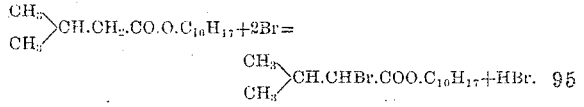

If in Examples 1, 2 and 3 the borneol is replaced by isoborneol, and in Example 4 the isovaleric acid borneol ester is replaced by the isoborneol ester, bromisovaleric acid isoborneol ester is obtained which is also an oily fluid boiling at about 160° centigrade at a pressure of 3 millimeters.

5. 250 grams of bromisovaleric acid are heated with 125 grams of camphene free from chlorin for a long time on a water bath with the addition of 25 grams of anhydrous zinc chlorid. After removing the zinc chlorid by washing with water, the bromisovaleric isoborneol ester produced is treated first with soda solution and then with water; the product separated from the water is then dried by means of sodium sulfate and fractionated *in vacuo*. The zinc chlorid may be replaced by any other suitable condensing agent. This reaction is illustrated by the following equation:

$$\begin{matrix}CH_3\\CH_3\end{matrix}\!\!>\!\!CH.CHBr.COOH + C_{10}H_{16} + ZnCl_2 =$$

$$\begin{matrix}CH_3\\CH_3\end{matrix}\!\!>\!\!CH.CHBr.COO.C_{10}H_{17} + ZnCl_2.$$

I claim as my invention:—

As new chemical products the bromisovaleric esters of the borneols, obtainable in the herein described manner, answering the formula $$\begin{matrix}CH_3\\CH_3\end{matrix}\!\!>\!\!CH.CH.Br-COO.C_{10}H_{17}$$

in which $C_{10}H_{17}$ signifies the bornyl or isobornyl radical, being colorless oily fluids, insoluble in water, soluble in organic solvents, and possessing sedative properties, substantially as described.

In testimony whereof I have hereunto set my hand in the presence of two subscribing witnesses.

MAX DOHRN.

Witnesses:
 HENRY HASPER,
 WOLDEMAR HAUPT.